(12) United States Patent
Zuercher

(10) Patent No.: US 10,801,632 B2
(45) Date of Patent: Oct. 13, 2020

(54) TWO-WAY VALVE WITH RAPID DECOMPRESSION FLOW DYNAMICS

(71) Applicant: AGM CONTAINER CONTROLS, INC., Tucson, AZ (US)

(72) Inventor: Eric J. Zuercher, Tucson, AZ (US)

(73) Assignee: AMG CONTAINER CONTROLS, INC., Tucson, AZ (US)

( * ) Notice: Subject to any disclaimer, the term of this patent is extended or adjusted under 35 U.S.C. 154(b) by 0 days.

(21) Appl. No.: 15/674,065

(22) Filed: Aug. 10, 2017

(65) Prior Publication Data

US 2017/0370489 A1  Dec. 28, 2017

Related U.S. Application Data

(63) Continuation-in-part of application No. 14/272,849, filed on May 8, 2014.

(51) Int. Cl.
| | | |
|---|---|---|
| *F16K 17/196* | (2006.01) | |
| *F16K 31/08* | (2006.01) | |
| *F16K 17/04* | (2006.01) | |

(52) U.S. Cl.
CPC ............ *F16K 17/196* (2013.01); *F16K 17/04* (2013.01); *F16K 31/084* (2013.01); *Y10T 137/7904* (2015.04)

(58) Field of Classification Search
CPC ...... F16K 17/196; F16K 17/04; F16K 31/084; F16K 15/026; Y10T 137/7777; Y10T 137/778
See application file for complete search history.

(56) References Cited

U.S. PATENT DOCUMENTS

| | | | |
|---|---|---|---|
| 620,936 A | | 3/1899 | Kunzer |
| 1,973,258 A | * | 9/1934 | Jensen ................. F16K 17/196 |
| | | | 137/493.6 |
| 2,444,163 A | | 6/1948 | Kocmich |
| 2,646,071 A | | 7/1953 | Wagner |
| 3,127,907 A | * | 4/1964 | Novak ................. F16K 17/196 |
| | | | 137/493.6 |
| 4,131,128 A | | 12/1978 | Gotzenberger |
| 4,273,153 A | | 6/1981 | Brown |
| 4,930,488 A | | 6/1990 | Pearman et al. |
| 5,320,136 A | | 6/1994 | Morris et al. |
| 5,513,395 A | | 5/1996 | Chlebek et al. |
| 6,092,545 A | | 7/2000 | Bedore |
| 6,935,364 B1 | | 8/2005 | Tarazona et al. |
| 7,255,323 B1 | * | 8/2007 | Kadhim ................. F16K 17/26 |
| | | | 137/529 |
| 7,506,663 B2 | | 3/2009 | Thomas et al. |
| 2008/0128033 A1 | | 6/2008 | McGonigle et al. |
| 2009/0193908 A1 | | 8/2009 | Dana |

* cited by examiner

*Primary Examiner* — Reinaldo Sanchez-Medina
*Assistant Examiner* — Nicole Gardner
(74) *Attorney, Agent, or Firm* — Quarles & Brady LLP

(57) ABSTRACT

Two-way pressure relief valves featuring dual poppets and magnets that allow very rapid flow. Such flow is accomplished by a valve housing enclosing a hollow interior portion containing a stationary member including a magnet and a first pressure-movable poppet disposed in sealing arrangement with the housing and including a second magnet. To provide flow in the other direction, a second moveable poppet disposed coaxially and in sealing arrangement with the first poppet and is coupled to a spring that extends from a first end of the second poppet to a support structure coupled to the second magnet.

23 Claims, 5 Drawing Sheets

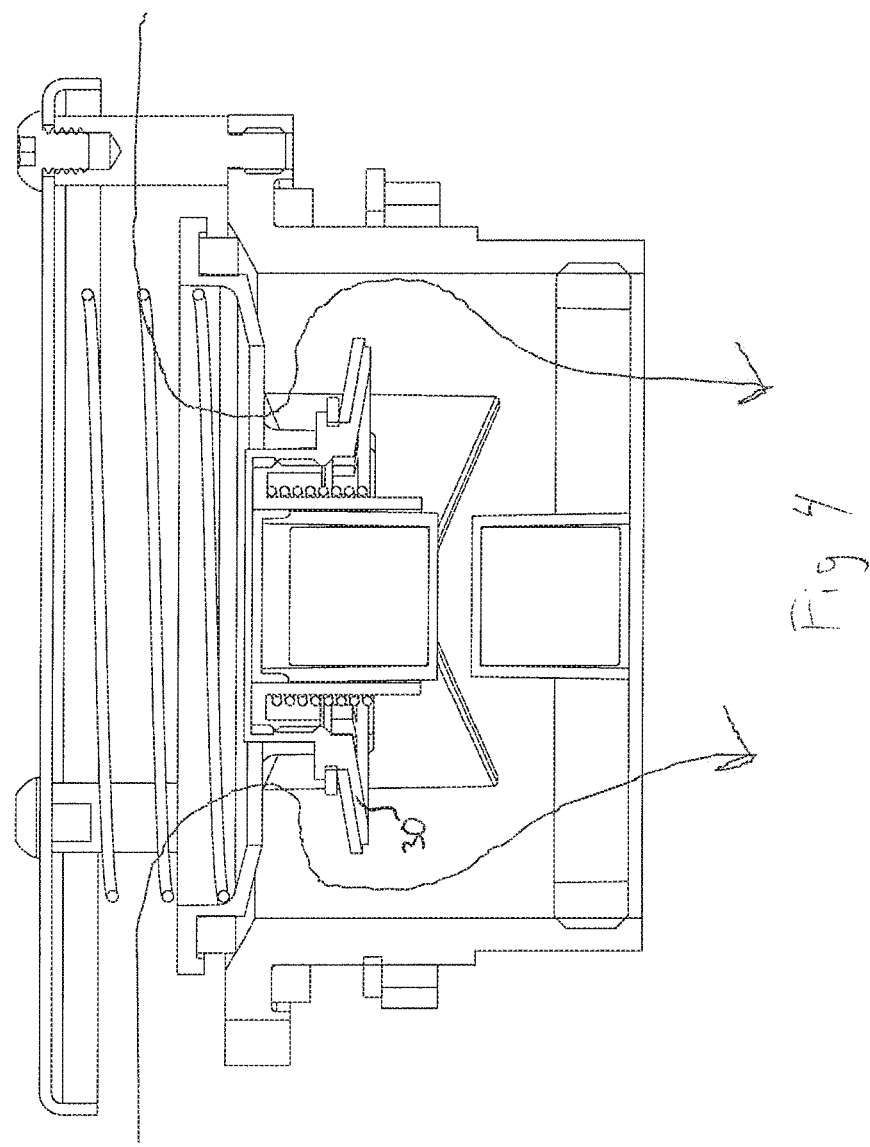

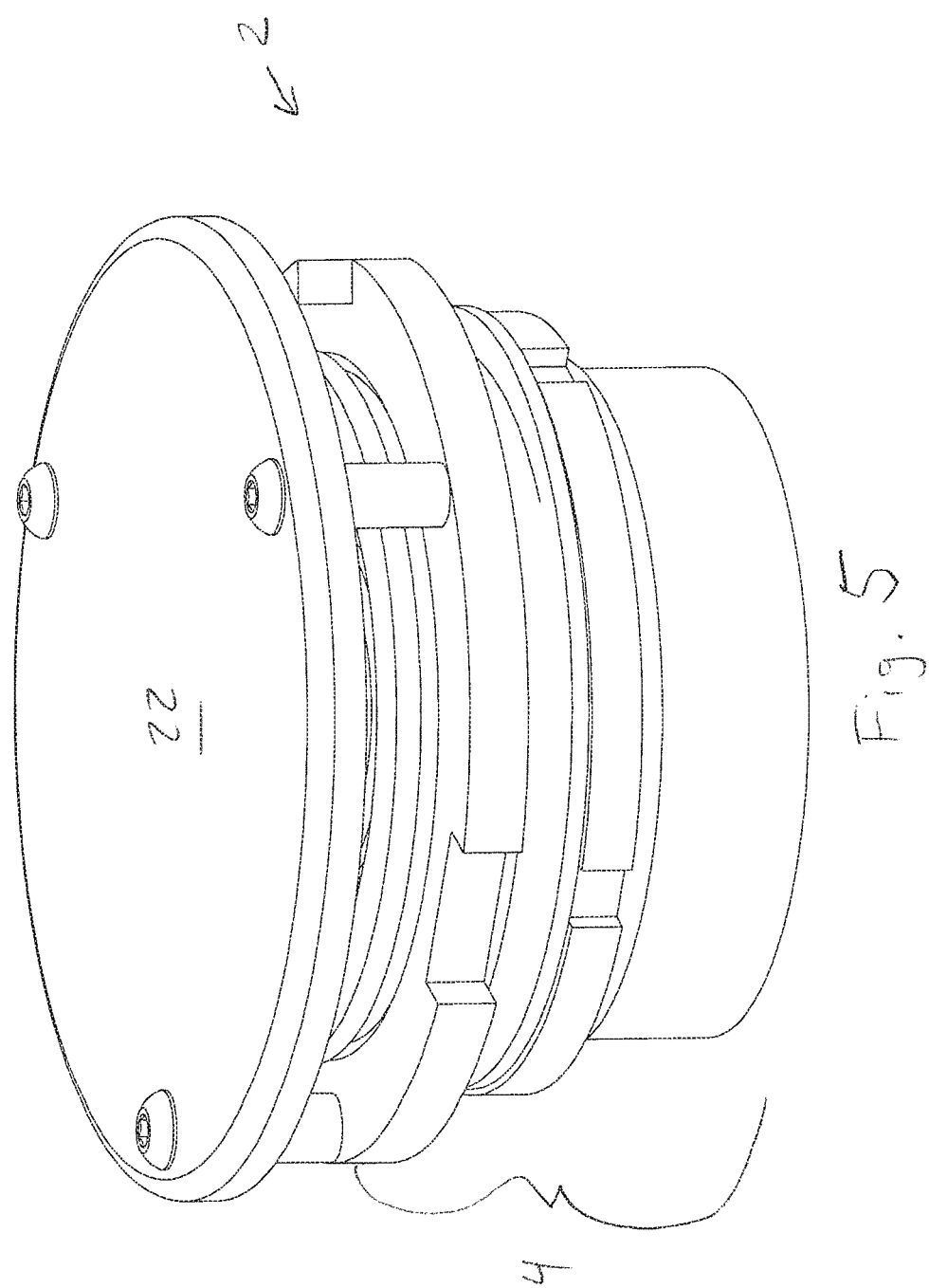

TWO-WAY VALVE WITH RAPID DECOMPRESSION FLOW DYNAMICS

CROSS REFERENCE TO RELATED APPLICATION

This application is a continuation-in-part of U.S. application Ser. No. 14/272,849 filed on May 8, 2014. The contents of that application are hereby incorporated by reference.

BACKGROUND OF THE INVENTION

Field of the Invention

The embodiments described herein relate to improved two-way valve assemblies especially useful in venting containers and the like.

Description of the Related Art

Pressure relief valves prevent excessive pressure or vacuum buildup in sealed containers, which reduces container weight, cube, and cost. A variety of pressure relief valves have been developed over the years, including valves that keep dust, water, and blowing sand from entering containers.

In some applications, the pressure or vacuum differential versus flow rate profile of a valve can be a critical factor in whether a sealed container will deform (or even explode). In other words, if a valve cannot expel or intake air fast enough, damage to the container and contents can result.

One specific container pressure-buildup situation that occurs during air transport is the rapid decompression event, when the air pressure outside the container drops precipitously. This can occur when an aircraft hold suddenly loses pressure while the aircraft is at high altitude, and the containers in the hold need to be depressurized very quickly. A container that cannot equalize pressure quickly might explode, thereby putting the aircraft and persons at risk.

While traditional two-way pressure relief valves may effectively defuse decompression events for small containers, they usually have insufficient flow capacity for containers with volumes larger than several cubic feet. The reason for this is that a traditional valve depends upon a compression spring to keep its poppet closed, and, although the poppet needs to open as far as possible to maximize the valve's air flow, the poppet meets with increasing opening resistance from the compression spring the farther it opens. This behavior of the compression spring limits the maximum flow rate of the valve.

SUMMARY OF THE INVENTION

In one aspect, pressure relief valves featuring both spring and magnet controlled poppets that allow very rapid gas or air outflow are disclosed. Embodiments of the two-way valve include a valve housing enclosing a hollow interior containing a stationary member with a first magnet coupled proximally to a first end of the housing and a first pressure-movable (outflow) poppet disposed in sealing arrangement proximally to a second end of the housing and including a second magnet. The first pressure-moveable poppet further includes a second poppet disposed coaxially and in sealing arrangement with the first pressure-moveable poppet and is coupled to a spring that extends from a first end of the second poppet to a support member coupled to the second magnet.

Thus, this disclosure generally relates to an improved pressure relief valve that utilizes a pair of magnets that control actuation of a first poppet (to allow flow in a first direction) in combination with a compression spring poppet to allow flow in the other/opposite direction. This design yields a higher flow rate for the "magnet poppet" than a spring-actuated valve because the attraction between two magnets decreases with the square of the distance between them. This means that once the poppet overcomes the threshold pressure and the valve opens, the force holding the poppet closed actually decreases rather than increases. The only force acting on the "magnetic poppet" to close it again is either the attraction of the pair of magnets or a return force member. For example, a third magnet or weak compression spring that is just strong enough to push the poppet closed against a zero pressure differential may be utilized.

Various other purposes and advantages of the invention will become clear from its description in the specification that follows. Therefore, to the accomplishment of the objectives described above, this invention includes the features hereinafter fully described in the detailed description of the preferred embodiments, and particularly pointed out in the claims. However, such description discloses only some of the various ways in which the invention may be practiced.

BRIEF DESCRIPTION OF THE DRAWINGS

FIG. 4 illustrates the valve of FIG. 2 with the second poppet open (for inflow).

FIG. 5 illustrates a perspective view of the two-way valve in FIG. 1

DETAILED DESCRIPTION OF THE PREFERRED EMBODIMENTS

Figure 1:
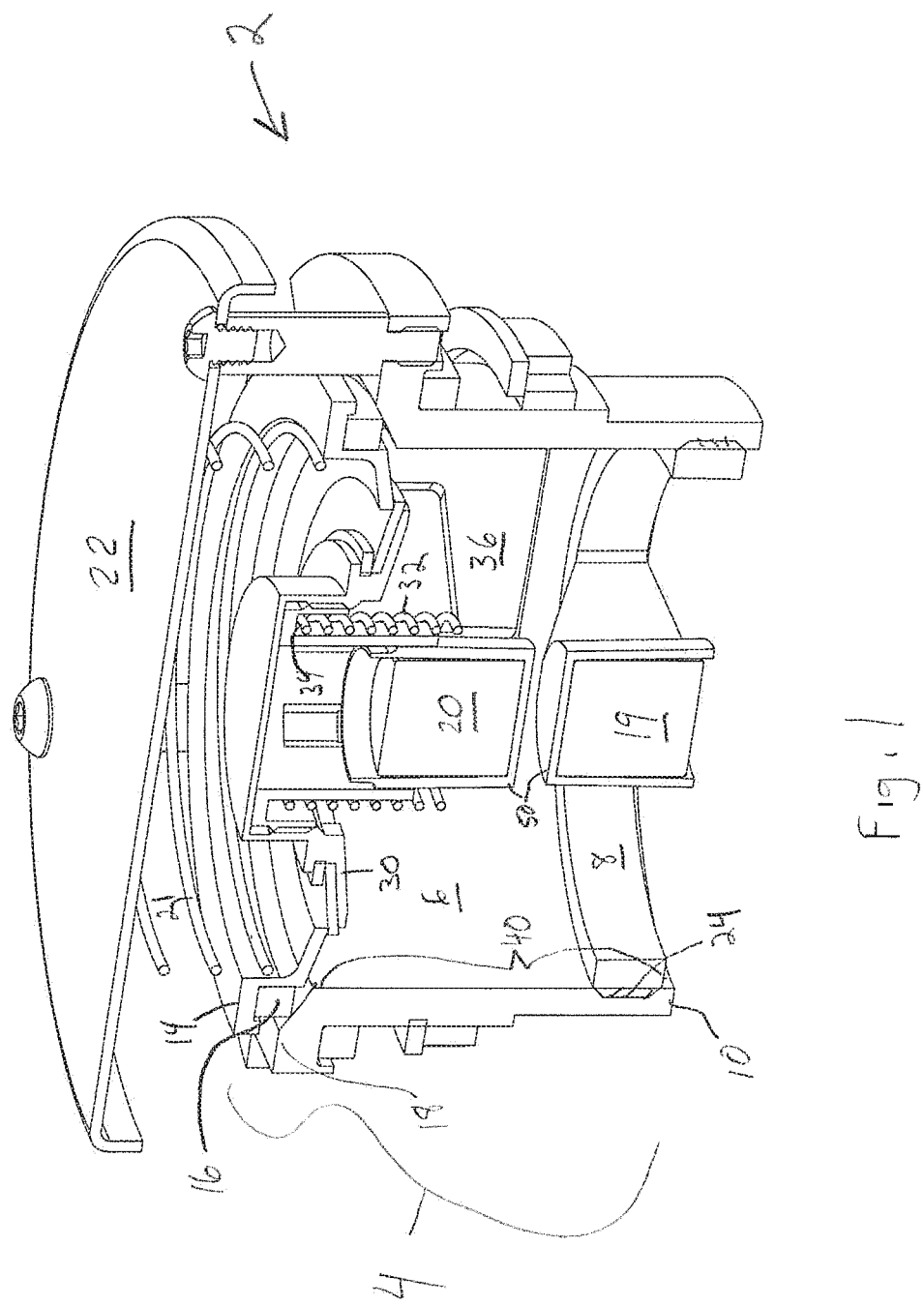
FIG. 1 depicts a perspective, cut-a view of a two-way valve embodiment.

As shown in perspective view in FIG. 1, a pressure relief valve 2 is generally depicted that includes a valve housing 4. The valve housing 4 encloses a hollow interior portion 6 that contains a stationary member 8 coupled with and disposed proximally to a bottom end 10 of the housing. A first pressure-movable poppet 14 is disposed in sealing arrangement (for example, by virtue of having sealing ring 16) proximally to a top end 18 of the housing 4. The stationary member 8 and the first pressure-moveable poppet 14 each include a magnet, i.e., magnets 19 and 20.

Figure 2:
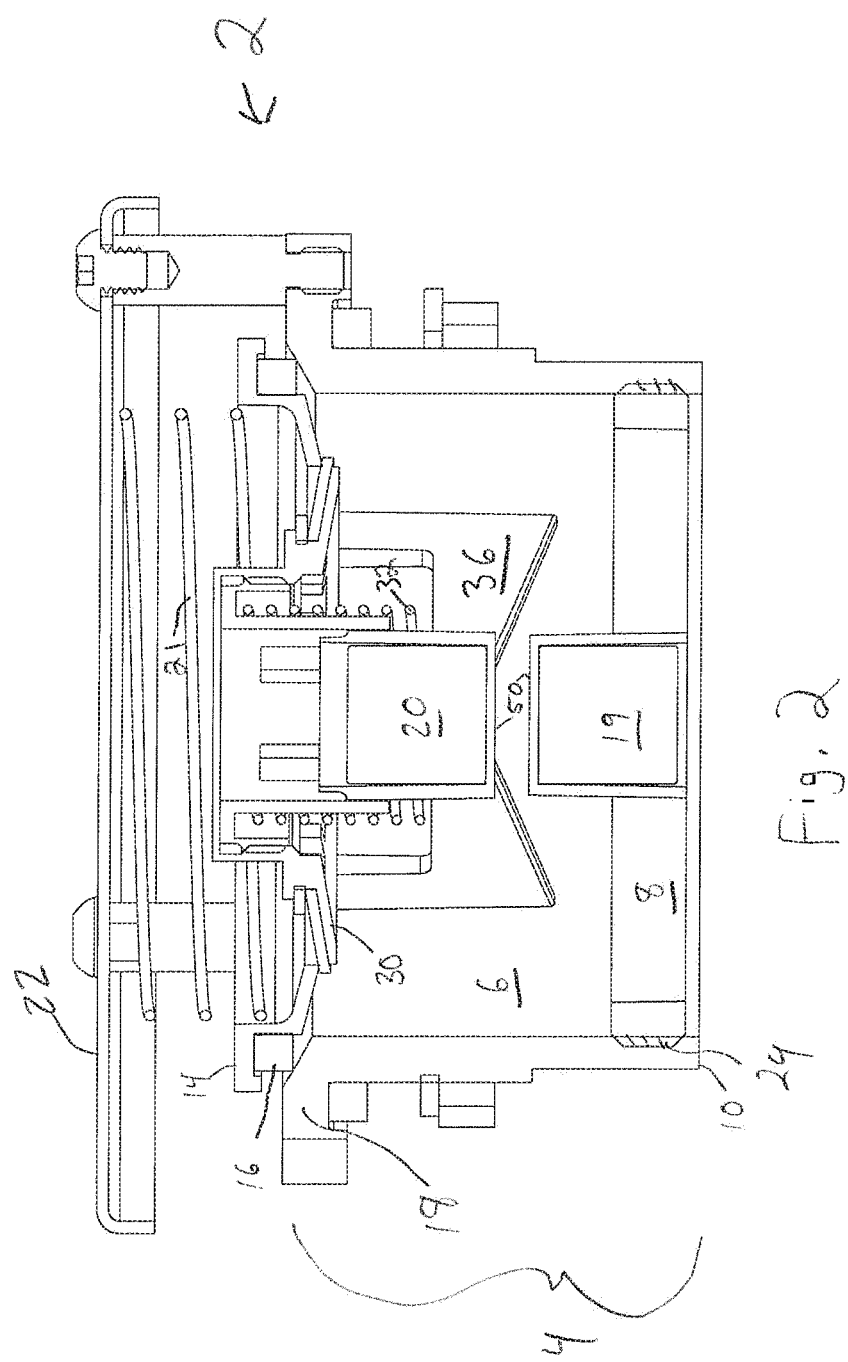
FIG. 2 depicts a front-elevational cut-away view of the valve embodiment of FIG. 1 in a closed position.
Figure 3:
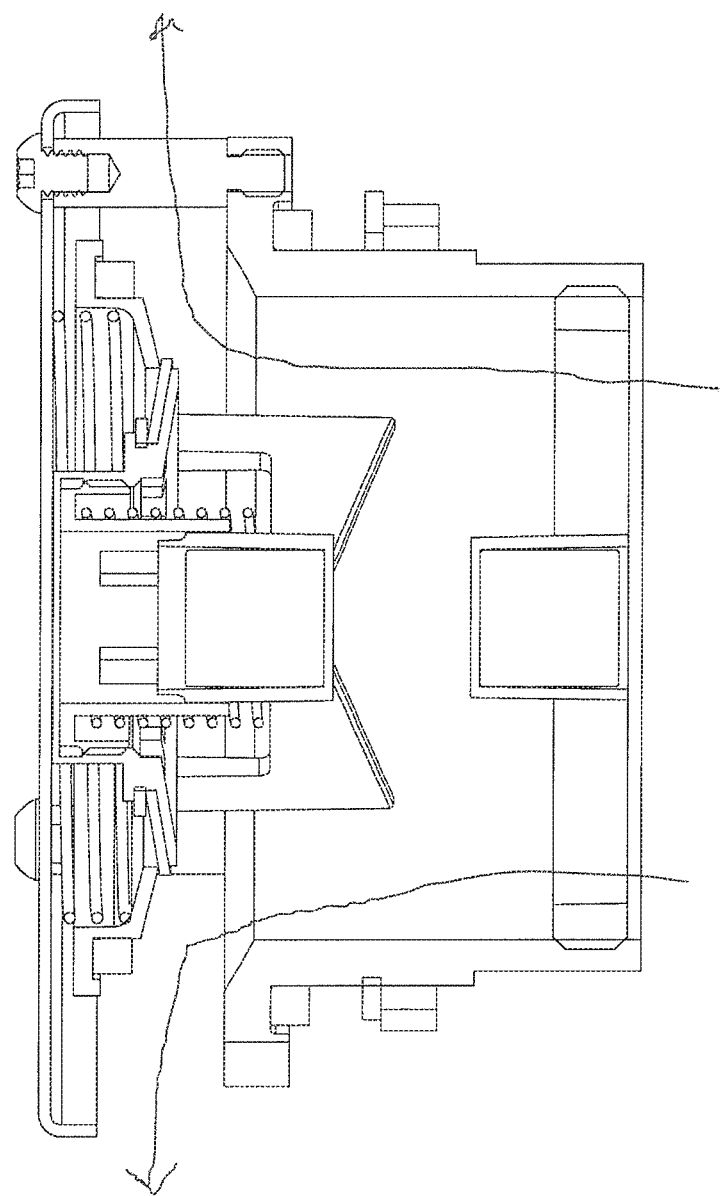
FIG. 3 illustrates the valve of FIG. 2 with the first poppet open (for outflow).

Preferably, magnets 19 and 20 are substantially centrally disposed in relation to the stationary member 8 and first pressure-moveable poppet 14 and are configured such that the pressure relief valve 2 stays closed until a gas or air pressure overcomes an attraction force between the magnets, thereby opening valve by "lifting" poppet 14 such that sealing ring 16 is raised (see FIG. 3 versus FIG. 2) and gas or air flows out of the pressure relief valve. Once the pressure differential acting on valve 2 is approximately zero, the attraction of magnets 19 and 20 can induce the poppet to close. By adjusting the separation distance of the magnets so that there is always enough attractive force to return the poppet to the closed position, one may also have the poppet close at pressure differentials other than zero.

Nonetheless, it has been found that the attraction of magnets 19 and 20 alone may not be sufficient to close the poppet consistently in all orientations. For example, when the valve is oriented so that gravity is pulling the poppet open, the magnets coupled with the poppet and stationary member may not be strong enough to pull the poppet closed again. Thus, a return force member may be added. The return force member may be, for example a spring 21 or a third magnet (not shown) disposed at the top or under the top of the first poppet under cover 22. The spring or magnet is not strong enough to impede the flow significantly, just strong enough to close the poppet under about zero pressure differential.

In some applications, it was found that even a stainless steel spring is magnetic enough to get pulled to its solid height by the large, powerful magnets in the 4"-diameter valve. Accordingly, a non-magnetic (e.g., phosphor bronze spring) is preferred in such applications.

As shown in this embodiment, the valve housing 4 is cylindrical and contains a threaded portion 24 along the hollow interior portion 6. Thus, the stationary member 8 can threadedly engage the threaded portion 24, thereby making stationary member adjustable such that the distance (and thus attraction force) between magnets 19 and 20 is adjustable.

Preferably, the valve is made from aluminum with a polycarbonate poppet and silicone seals. However, any suitably rigid plastic or other material may be used. Also preferably, the magnets are nickel-plated neodymium.

To accommodate gas or air flow in a second direction (i.e., inflow as shown in FIG. 4), the first pressure-moveable poppet 14 further comprises a second poppet 30 disposed coaxially and in sealing arrangement with the first pressure-moveable poppet. The second poppet 30 is coupled to a spring 32 that extends from a first end 34 of the second poppet to a support member, such as the lateral support member or fin 36, which is coupled to the second magnet 20.

As with the first poppet 14, the second pressure-movable poppet 30 is configured to be circular. Moreover, as can be seen in FIGS. 1-4, the hollow interior 6 defines a gas or air flow channel 40 beginning at the bottom end 10 of the valve housing and terminating at the top end 18 of the valve housing, and the first and second poppets are disposed atop the hollow interior portion at the top end 18 such that a portion of the poppets extends into said flow channel towards the bottom end 10 and that portion is at least partially exterior to the flow channel during an outflow of air or gas (i.e., when outflow is occurring; compare FIGS. 2 and 3). Note that the directions "top" and "bottom" are used with respect to the orientation of the Figures and are not meant to imply any preferred orientation for elements so described.

Conceiving of the improved pressure relief valve was not straight forward. On the one hand, the pair of magnets had to be capable of keeping their properties over a wide range of temperatures and of providing a large amount of force (in keeping the poppet closed) in a fairly compact volume. On the other hand, the magnets could not be so powerful as to interfere with electronic equipment (such as aircraft avionics) and had to be prevented from striking each other upon closing, which could lead to damage. Thus, the magnets preferably are covered in plastic 50.

The magnet valve is a design that improves upon "traditional" valve designs in that it yields much higher air flow. Traditional valves utilize compression springs for sealing, which means that the spring force on the valve's poppet increases linearly as the valve opens. However, the magnet design replaces the compression spring with a pair of magnets, whose attraction forces for each other decrease with the square of the distance of separation. This allows far more air to pass through the valve at a given pressure differential. In fact, the pressure differential between the inside and outside of a container can be almost completely eliminated, which is nearly impossible for a "traditional" pressure relief valve.

This inventive valve will be useful for many applications that require a maximum amount of air flow in the smallest possible valve. Its most apparent application is for rapid decompression events, during which an aircraft hold suddenly loses pressure, and containers in the hold need to be depressurized very quickly to avoid catastrophic damage.

It was found that the flow performance of the valves is mostly independent of the cracking point. As soon as the poppet opens, it "flies" all of the way open and stays open so long as a pressure differential and flow are maintained. So, a valve that opens at ½ psi flows the same amount of air as a valve that opens at 2 psi, in the pressure region where both valves are open. This is drastically different from a traditional valve with a compression spring, where a valve with a higher cracking point will flow less air than a valve with a lower cracking point, at all pressure points. For a traditional valve, not only is the pressure versus flow curve for higher cracking valves translated to the right, but the curve is flattened.

One unexpected consequence of the magnet valve's flow characteristics is that it allows more air entry into storage containers and therefore more moisture ingress. One of the primary sources of pressure differentials in containers that pressure relief valves are used to relieve is diurnal temperature variations during container storage. A pressure relief valve will prevent the container from exploding or imploding due to pressure or vacuum buildups. The second poppet solves this problem such that air and moisture ingress is not a concern. Nonetheless, the flow directions may be reversed in some embodiments for certain applications (i.e., the configuration of the magnet and spring valves could be reversed to provide a greater rate of inflow rather than outflow).

Another unique feature of the flow through the magnet valve is that the pressure drop across the valve actually falls with increasing flow, at least until the poppet is fully open. This behavior is also far different from the behavior of a traditional pressure relief valve, where an increase in flow is always accompanied by a rise in pressure differential.

Various changes in the details and components that have been described may be made by those skilled in the art within the principles and scope of the invention herein described in the specification and defined in the appended claims. Therefore, while the present invention has been shown and described herein in what is believed to be the most practical and preferred embodiments, it is recognized that departures can be made there from within the scope of the invention, which is not to be limited to the details disclosed herein but is to be accorded the full scope of the claims so as to embrace any and all equivalent processes and products. All references cited in this application are hereby incorporated by reference herein.

What is claimed is:

1. A two-way valve, comprising:
 a valve housing enclosing a hollow interior containing a stationary member with a first magnet coupled proximally to a first end of said housing and a first pressure-movable poppet disposed in a sealing arrangement proximally to a second end of said housing and including a second magnet;

wherein said first pressure-moveable poppet:

(a) further comprises a second pressure-movable poppet disposed coaxially and in sealing arrangement with the first pressure-moveable poppet and (b) is coupled to a spring that extends from a first end of the second poppet to a support member, said support member coupled between said second magnet and said first poppet and free to translate with said first poppet, said second magnet disposed between the first end of the second poppet and the first magnet;

wherein said housing and said first and second pressure-movable poppets are configured to be circular, said hollow interior defines a gas-or-air-flow channel beginning at said first end of the valve housing and terminating at said second end of the valve housing, and said first and second poppets are disposed atop said hollow interior such that a portion of the poppets extends into said flow channel towards the first end of said valve housing and said portion is at least partially exterior to said flow channel during an outflow of air or gas; and wherein said magnets are substantially centrally disposed in relation to said stationary member and pressure-moveable poppets and said magnets are disposed to attract each other such that said first pressure-movable poppet is biased to a closed position relative to the gas-or-air-flow channel; and wherein said support member and said spring are jointly configured and arranged to bias said second pressure-movable poppet to a closed position relative to the first pressure-movable poppet.

2. The valve of claim 1, wherein said valve housing contains a threaded portion along said hollow interior.

3. The valve of claim 2, where said stationary member threadedly engages said threaded portion.

4. The valve of claim 3, wherein said stationary member is adjustable within said threaded portion such that said attraction force between said magnets is adjustable.

5. The valve of claim 1, further comprising a return force member between and coupled to a cover of the housing and said pressure-movable poppets, said return force member configured to return the first pressure-movable poppet to the closed position relative to the gas-or-airflow channel after the first poppet has opened.

6. The valve of claim 5, wherein said return force member is a spring.

7. The valve of claim 6, wherein said return force member comprises a non-magnetic material.

8. The valve of claim 7, wherein said return force member comprises phosphor-bronze.

9. The valve of claim 5, wherein said return force member actuates the first pressure-moveable poppet to the closed position relative to the gas-or-air-flow channel when a pressure differential reaches approximately zero.

10. The valve of claim 1, wherein said first pressure-moveable poppet comprises a plurality of fins extending radially therefrom and coupled to said second magnet.

11. A two-way valve, comprising:

a valve housing enclosing a hollow interior containing a stationary member with a first magnet coupled proximally to a first end of said housing and a first pressure-movable poppet disposed in a sealing arrangement proximally to a second end of said housing and including a second magnet;

wherein said first pressure-moveable poppet:

(a) further comprises a second poppet disposed coaxially and in sealing arrangement with the first pressure-moveable poppet and (b) is coupled to a spring that extends from a first end of the second poppet to a support member, said support member coupled between said second magnet and said first poppet and is free to translate with said first poppet, said second magnet disposed between the first end of the second poppet and the first magnet;

wherein said housing and said first and second poppets are configured to be circular, said hollow interior defines a gas-or-air-flow channel beginning at said first end of the valve housing and terminating at said second end of the valve housing, and said first and second poppets are disposed atop said hollow interior such that a portion of the poppets extends into said flow channel towards the first end of said valve housing and said portion is at least partially exterior to said flow channel during an outflow of air or gas; and wherein said magnets are substantially centrally disposed in relation to said stationary member and pressure-moveable poppets and said magnets are disposed to attract each other such that said first pressure-movable poppet is biased to a closed position relative to the gas-and-air-flow channel; and wherein said first pressure-moveable poppet is conically shaped, with its widest end having a sealing ring disposed thereon.

12. The valve of claim 11, wherein said valve housing contains a threaded portion along said hollow interior.

13. The valve of claim 12, where said stationary member threadedly engages said threaded portion.

14. The valve of claim 13, wherein said stationary member is adjustable within said threaded portion such that said attraction force between said magnets is adjustable.

15. The valve of claim 11, further comprising a return force member between and coupled to a cover of the housing and said pressure-movable poppets, said return force member configured to return the first pressure-movable poppet to the closed position relative to gas-or-air-flow channel after the first poppet has opened.

16. The valve of claim 15, wherein said return force member is a spring.

17. The valve of claim 16, wherein said return force member comprises a non-magnetic material.

18. The valve of claim 17, wherein said return force member comprises phosphor-bronze.

19. The valve of claim 15, wherein said return force member is just strong enough to return said first pressure-moveable poppet to the closed position relative to the gas-or-air-flow channel when a pressure differential is approximately zero.

20. The valve of claim 11, wherein said first pressure-moveable poppet comprises a plurality of fins extending radially therefrom and coupled to said second magnet.

21. A two-way valve, comprising:

a valve housing enclosing a hollow interior containing a stationary member with a first magnet coupled proximally to a first end of said housing and a first pressure-movable poppet disposed in sealing arrangement proximally to a second end of said housing and including a second magnet;

wherein said first pressure-moveable poppet:
(a) further comprises a second poppet disposed coaxially and in sealing arrangement with the first pressure-moveable poppet and
(b) is coupled to a spring that extends from a first end of the second poppet to a support member coupled to said second magnet and the first poppet and is free to translate with said first poppet, said second magnet disposed between the first end of the second poppet and first magnet;

wherein said housing and said first and second pressure-movable poppets are configured to be circular, said hollow interior defines a gas-or-air-flow channel beginning at said first end of the valve housing and terminating at said second end of the valve housing, and said first and second poppets are disposed atop said hollow interior such that a portion of the poppets extends into said flow channel towards the first end of said valve housing and said portion is at least partially exterior to said flow channel during an outflow of air or gas;

wherein said magnets are substantially centrally disposed in relation to said stationary member and pressure-moveable poppets;

wherein said first pressure-movable poppet is configured and arranged to:
(i) remain in a closed state relative to the housing when a pressure difference between the gas-or-air-flow channel and an environment exterior to the gas-or-air-flow channel does not exceed an outflow pressure threshold, and
(ii) move from a closed state to a fully open state relative to the housing when a pressure difference between the gas or airflow channel and the environment exterior to the gas-or-air-flow channel equals or exceeds the outflow pressure threshold, the outflow pressure threshold being the outflow pressure that is sufficient to crack the first poppet from a closed state;

wherein said spring is configured and arranged to:
(a) maintain the second pressure-movable poppet in a closed state relative to the first pressure-movable poppet when a pressure difference less than an inflow threshold exists between the gas-or-air-flow channel and the environment exterior to the gas-or-air-flow, the closed state relative to the first pressure-movable poppet preventing air or gas flow through the second pressure-movable poppet; and
(b) maintain the second pressure-movable poppet in an open state relative to the first pressure-movable poppet when a pressure difference greater or equal to the inflow threshold exists between the gas-or-air-flow channel the environment exterior to the gas-or-air-flow channel, the open state relative to the first pressure-movable poppet allowing air or gas flow through the second pressure-movable poppet; and wherein said first pressure-movable poppet, when in the open state relative to the housing, is further configured and arranged to provide a rate of gas outflow, the rate of gas outflow increasing for increasing values of the pressure difference between the gas-or-air-flow channel and the environment exterior to the gas-or-air-flow channel.

22. The valve of claim 21 wherein the first pressure-movable poppet, when in the open state relative to the housing, is further configured and arranged to provide a maximum value of the rate of gas outflow;

wherein the second pressure-movable poppet, when in the open state relative to the first pressure-movable poppet is configured and arranged to provide a rate of gas inflow having a maximum value; and wherein the maximum value of the rate of gas inflow is less than the maximum value of the rate of the rate of gas outflow.

23. The valve of claim 21 wherein, the first pressure-movable poppet is configured and arranged, while entering the open state relative to the housing, to proceed through a series of intermediate states; and wherein, when the first pressure-movable poppet is in each of the series of intermediate states, the pressure difference between the gas-or-air-flow channel and the environment exterior to the gas-or-air-flow channel decreases for increasing values of the rate of gas outflow.

* * * * *